United States Patent [19]

Smith

[11] Patent Number: 4,497,172

[45] Date of Patent: Feb. 5, 1985

[54] BEARING CHAMBER PRESSURIZATION SYSTEM FOR A MACHINE

[75] Inventor: Stanley Smith, Gloucestershire, England

[73] Assignee: Rolls-Royce Limited, London, England

[21] Appl. No.: 445,569

[22] Filed: Nov. 30, 1982

[30] Foreign Application Priority Data

Dec. 8, 1981 [GB] United Kingdom ............... 8137011

[51] Int. Cl.³ ........................... F02K 3/06; F02C 7/06
[52] U.S. Cl. .................................. 60/226.1; 60/39.08; 184/6.11; 277/3; 277/29
[58] Field of Search ............... 60/226.1, 39.07, 39.08; 308/187, 187.1; 384/130; 277/3, 28, 29; 415/111, 112, 113, 170 R, 170 A, 175, 176; 184/6.11

[56] References Cited

U.S. PATENT DOCUMENTS

| | | | |
|---|---|---|---|
| 2,672,010 | 3/1954 | Newcomb | 60/39.08 |
| 2,834,619 | 5/1958 | McNab | 277/28 |
| 3,041,834 | 7/1962 | Davies et al. | 60/39.091 |
| 3,171,354 | 3/1965 | Sohlemann | 415/175 X |
| 3,740,057 | 6/1973 | Doyle et al. | 277/28 X |
| 4,402,180 | 9/1983 | Reid et al. | 60/39.08 |

Primary Examiner—Carlton R. Croyle
Assistant Examiner—Jeffrey A. Simenauer
Attorney, Agent, or Firm—Parkhurst & Oliff

[57] ABSTRACT

A bearing chamber pressurization system for a ducted fan gas turbine engine uses fan delivery air at relatively low pressure and temperature for bearing chamber pressurization. In order to avoid the possibility of a flow reversal in the pressurization air when the fan speed is reduced, a second higher pressure air supply from the core engine is made available under the control of a valve and pressure sensing device, and which comes into operation when the ratio of the bearing chamber pressure and the supply pressure reaches a pre-determined minimum.

9 Claims, 2 Drawing Figures

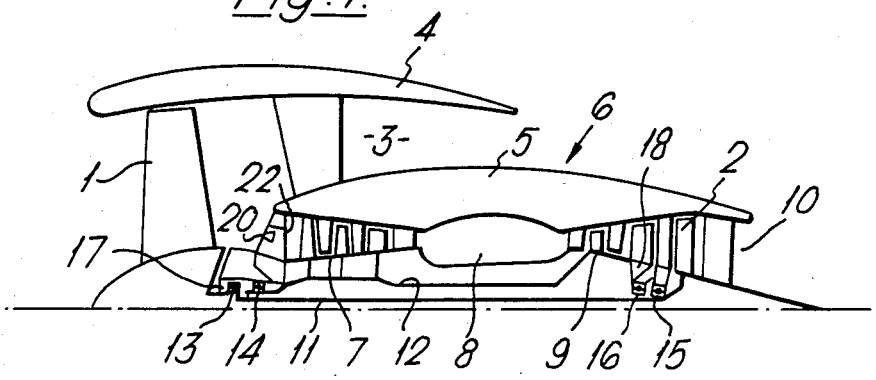
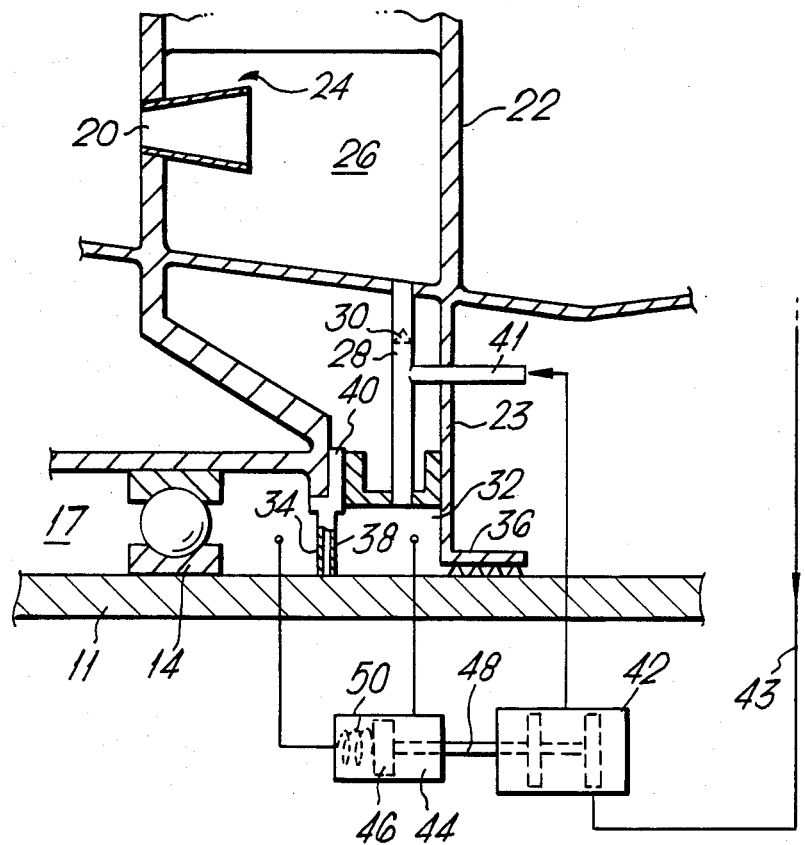

BEARING CHAMBER PRESSURIZATION SYSTEM FOR A MACHINE

The present invention relates to bearing chamber pressurisation systems for machines, e.g. gas turbine engines.

In gas turbine engines air is tapped from the engine compressor and is blown into the bearing chambers through the bearing chamber seals to prevent oil escaping from the bearing chambers and contaminating the air systems in the engine.

Apart from any heat carried into the bearing chambers by the air itself, heat generation due to friction between the air and the rotating components of the chamber is proportional to the pressure of the air.

It is preferable, therefore, to use air for bearing chamber pressurisation which has undergone the least amount of compression in the engine compressor in order to minimise the temperature and pressure of the air and, hence, minimise the heat imparted to the oil in the bearing chamber.

A problem which arises, however, is that the bearing chamber is vented, usually, to atmospheric pressure, through a breather so that the minimum pressure in the bearing chamber is atmospheric. In order to ensure that there is no reversal of flow whereby oil-contaminated air from the bearing chamber into the engine, the pressure outside the bearing chamber has to be greater than atmospheric pressure. Although air having passed through one or two stages of compression in the compressor would be at a high enough pressure for most operating conditions of the engine, there can be conditions, for example, when the engine is throttled back, when the static pressure on the wall of the compressor from which the bleed is taken can fall below atmospheric.

The usual solution to this problem is, therefore, to take a bearing chamber pressurisation bleed from sufficiently far downstream in the compressor that the pressure is greater than that in the bearing chamber under all possible engine conditions. Not only is this wasteful of air on which the compressor has done work, but, as explained above, this higher pressure air puts additional heat into the oil system.

An object of the present invention is to provide a bearing chamber pressurisation system which is capable of using air at low pressure for bearing chamber pressurisation without the risk of a flow reversal.

This problem is solved according to the invention as defined by the appendant claims by providing a second, relatively higher pressure air supply to the bearing chamber, which is controlled to take over only when the pressure difference between the lower pressure supply and the bearing chamber interior reaches a predetermined level. Thus, for normal operation, low pressure cool air is used to pressurise the bearing chamber, thus minimising the heat picked up by the oil, but a higher pressure supply is available when conditions indicate a possibility of a reversal of flow through the system.

In a particular application of the invention, the gas turbine engine is a ducted fan engine, the relatively low pressure air being drawn from the fan delivery, and the relatively higher pressure air being drawn from a stage of the main engine compressor.

The bearing chamber is preferably supplied with air for pressurisation, and scavenged, separately from any other bearing chambers of the engine.

The invention will now be more particularly described by way of example only, with reference to the accompanying drawings in which:

FIG. 1 illustrates diagrammatically a gas turbine ducted fan engine incorporating a bearing chamber pressurisation system of the present invention, and, FIG. 2 is an enlarged diagrammatic illustration of the system of FIG. 1.

Referring now to the drawing there is shown a gas turbine ducted fan engine having a fan 1 driven by a fan turbine 2. Part of the air compressed by the fan is delivered to a by-pass duct 3 defined between a fan cowl 4 and a casing 5 of a core engine 6. The remainder of the air compressed by the fan passes into the core engine where it is further compressed in a compressor 7, before passing through combustion equipment 8 to a turbine 9, for driving the compressor 7, and an exhaust nozzle 10.

A shaft 11 interconnects the turbine 2 and the fan 1, and a further shaft 12 interconnects the turbine 9 and the compressor 7. The shafts 11 and 12 are mounted in front and rear bearings 13,14,15 and 16 respectively, and the bearings are disposed inside front and rear bearing chambers 17 and 18 respectively for lubrication thereof. The bearing chambers 17 and 18 are pressurised with air from the engine fan and compressor, and it is with this aspect of the engine design that the invention is particularly concerned.

Referring now to FIG. 2, the relatively lower pressure air is provided by at least one pitot pickup (aperture) 20 in one of the struts 22 downstream of the fan 1, at the entrance to the core engine.

The air entering the pitot pickup 20 is diffused through a diffuser 24 into a plenum chamber 26 within the strut 22 to maximise its static pressure before it enters the bearing chamber. From the plenum chamber 26 the air passes via ducting 28 and a non-return valve 30 to a space 32 defined between two seals 34 and 36 which control the flow into and out of the bearing chamber at one end thereof.

The seals may be of any conventional type as used between static and rotating structure. Seal 34 is, however, shown in this example of the invention as a brush seal consisting of a plurality of tightly-packed resilient bristles 38 mounted in an annular backing ring 40 which is in turn mounted on the wall of the bearing chamber. The bristles 38 extend into contact with the shaft 11 to restrict air flow from the space 32 into the bearing chamber. Seal 36 is shown as a conventional labyrinth seal extending between the fixed structure 23 and the shaft 11, which restricts air flow from the space 32 to the interior of the engine, and also acts to control the pressure in the space.

Further ducting 41 is provided which communicates at one end with the ducting 28 downstream of the non-return valve, and which communicates at its other end with a control or throttle valve 42. The throttle valve 42 receives a supply of relatively higher pressure air from the core engine compressor, as indicated by line 43, but is normally closed to prevent access of the higher pressure air to the space 32. The throttle valve is controlled from a pressure difference sensing unit 44.

The pressure difference sensing (or control) unit 44 includes a piston 46 connected by a link 48 to the throttle valve 42. A spring 50 biasses the link in a direction to open the throttle valve. Chambers on opposite sides of the piston 46 communicate with the space 32 and the interior of the bearing chamber, and while the pressure in the space 32 is greater than that in the bearing chamber, the piston keeps the valve 42 closed. When the pressure in the space is reduced to within a pre-set level, say 1 p.s.i., of the pressure in the bearing chamber, the spring force overcomes the pressure forces and opens the valve. When the throttle valve is open, the relatively higher pressure air is allowed to flow into the space 32 from which it enters the bearing chamber through the brush seal 34 to prevent oily air escaping from the bearing chamber.

When the correct pressure differential is restored, however, the pressure difference sensing unit will close the valve and shut off the flow of relatively higher pressure air.

Thus, for normal operation, air from the fan delivery at relatively low pressure and temperature can be used to pressurise the front bearing chamber. This has the beneficial effect of cooling the oil in the chamber. The lower the pressure used, the greater is the liklihood of the higher pressure supply being activated, but also the greater the cooling effect on the oil in the chamber. Hence the actual pressure chosen will be a compromise between these effects.

Although in the example shown, the relatively lower pressure air has been taken from the fan delivery by the pitot pickup 20, a more conventional bleed from the inner wall of the by-pass duct may be used. Also the invention is applicable to engines other than by-pass engines, and in such engines the bleed of relatively lower pressure air can be taken from one of the upstream stages of the low pressure compressor.

I claim:

1. A bearing chamber pressurization system for a machine comprising a bearing chamber, a first air supply means for supplying air at a first, relatively lower pressure, to the bearing chamber for pressurizing the bearing chamber, a second air supply means which is capable of supplying air at a second, relatively higher pressure, to the bearing chamber through a control valve, and a control means which senses the difference between the pressure in the bearing chamber and the first pressure and opens the control valve only when the difference in the two pressures is reduced to a pre-determined level.

2. A bearing chamber pressurisation system as claimed in claim 1 and in which the bearing chamber is defined at least in part by a shaft, there being provided a first seal between the bearing chamber and the shaft, a second seal between fixed structure and the shaft and which is axially spaced from the first seal to form a space, said seals restricting fluid flow into or out of the bearing chamber, air from the two air supply means being directed into the bearing chamber via said space.

3. A bearing chamber pressurisation system as claimed in claim 2 and in which the machine is a ducted fan gas turbine engine, the first air supply being tapped from the fan air delivery through at least one aperture in struts in the fan air flow downstream of the fan.

4. A bearing chamber pressurisation system as claimed in claim 3 and in which a diffuser communicates between each aperture and a chamber within the respective strut to increase the static pressure of the air flowing into the aperture.

5. A bearing chamber pressurisation system as claimed in claim 2 and in which air from the first air supply means is directed into the space through a duct which incorporates a non-return valve, and further ducting is provided for directing air from the second air supply means into said space, the further ducting communicating with said duct at a point between the non-return valve and said space.

6. A bearing chamber pressurisation system as claimed in claim 5 and in which the machine is a ducted fan gas turbine engine, the first air supply being tapped from the fan air delivery through at least one aperture in struts in the fan air flow downstream of the fan.

7. A bearing chamber pressurisation system as claimed in claim 6 and in which a diffuser communicates between each aperture and a chamber within the respective strut to increase the static pressure of the air flowing into the aperture.

8. A bearing chamber pressurisation system as claimed in claim 1 and in which the machine is a ducted fan gas turbine engine, the first air supply being tapped from the fan air delivery through at least one aperture in struts in the fan air flow downstream of the fan.

9. A bearing chamber pressurisation system as claimed in claim 8 and in which a diffuser communicates between each aperture and a chamber within the respective strut to increase the static pressure of the air flowing into the aperture.

* * * * *